United States Patent [19]

Mindell

[11] Patent Number: 4,707,092
[45] Date of Patent: Nov. 17, 1987

[54] TRANSPARENCY TRANSPORT SYSTEM FOR OVERHEAD PROJECTOR

[75] Inventor: Marvin I. Mindell, Pittsford, N.Y.

[73] Assignee: D. O. Industries, Inc., East Rochester, N.Y.

[21] Appl. No.: 726,782

[22] Filed: Apr. 24, 1985

[51] Int. Cl.⁴ ............................................. G03B 21/12
[52] U.S. Cl. .............................. 353/109; 353/DIG. 5; 353/120
[58] Field of Search ......... 353/108, 109, 113, DIG. 2, 353/DIG. 3, DIG. 4, DIG. 5, 120, 121, 22–24, 26 R; 40/158 B, 159

[56] References Cited

U.S. PATENT DOCUMENTS

| | | |
|---|---|---|
| 2,383,465 | 8/1945 | Bradford ........................ 40/158 B X |
| 2,897,721 | 8/1959 | Cohn et al. . |
| 3,301,128 | 1/1967 | Brandt et al. . |
| 3,322,027 | 5/1967 | Forbes et al. ..................... 353/109 X |
| 3,524,703 | 8/1970 | Wright . |
| 3,531,193 | 9/1970 | Diehl ......................... 353/DIG. 5 X |
| 3,537,792 | 11/1970 | Furniss et al. . |
| 3,632,195 | 1/1972 | Strimling . |
| 3,905,694 | 9/1975 | Miragliotta ........................... 353/108 |
| 3,953,122 | 4/1976 | Walker-Arnott . |
| 4,140,383 | 2/1979 | Schmidt . |
| 4,177,587 | 12/1979 | Dorsen ............................... 40/159 X |
| 4,203,659 | 5/1980 | Constantine et al. . |
| 4,334,764 | 6/1982 | Rawson et al. . |
| 4,368,964 | 1/1983 | Carlson . |
| 4,431,282 | 2/1984 | Martin geb. Böser . |

FOREIGN PATENT DOCUMENTS

| | | | |
|---|---|---|---|
| 1914627 | 10/1970 | Fed. Rep. of Germany .... | 40/158 B |
| 2708430 | 8/1978 | Fed. Rep. of Germany ...... | 353/108 |
| 2838551 | 3/1980 | Fed. Rep. of Germany ...... | 353/120 |
| 1149436 | 7/1957 | France ................................. | 353/15 |
| 2396987 | 7/1977 | France ................................. | 353/108 |
| 0064250 | 5/1977 | Japan ................................... | 353/109 |

Primary Examiner—Harry N. Haroian
Attorney, Agent, or Firm—Stonebraker, Shepard & Stephens

[57] ABSTRACT

An overhead projector transparency transport system uses a transparent platen 20 extending over projection window 11 and beyond both sides of projector 10. A transparent belt 80 made of a base web 84 and a pocket web 85, fused together to form a series of pockets, receives a sequence of transparencies 100, and transverse fold lines formed between pockets 81 allow belt 80 to fan fold. Pocket web 85 is fused to base web 84 at inturned edges 95 of an open side 96 of each pocket 81 to trap a transparency 100 within its pocket, once inserted. Platen 20 is positioned so that transparent belt 80 can advance across platen 20 from a fan-fold supply stack 82 next to projector 10 and proceed to an automatically formed take-up stack 83 next to the other side of projector 10.

27 Claims, 8 Drawing Figures

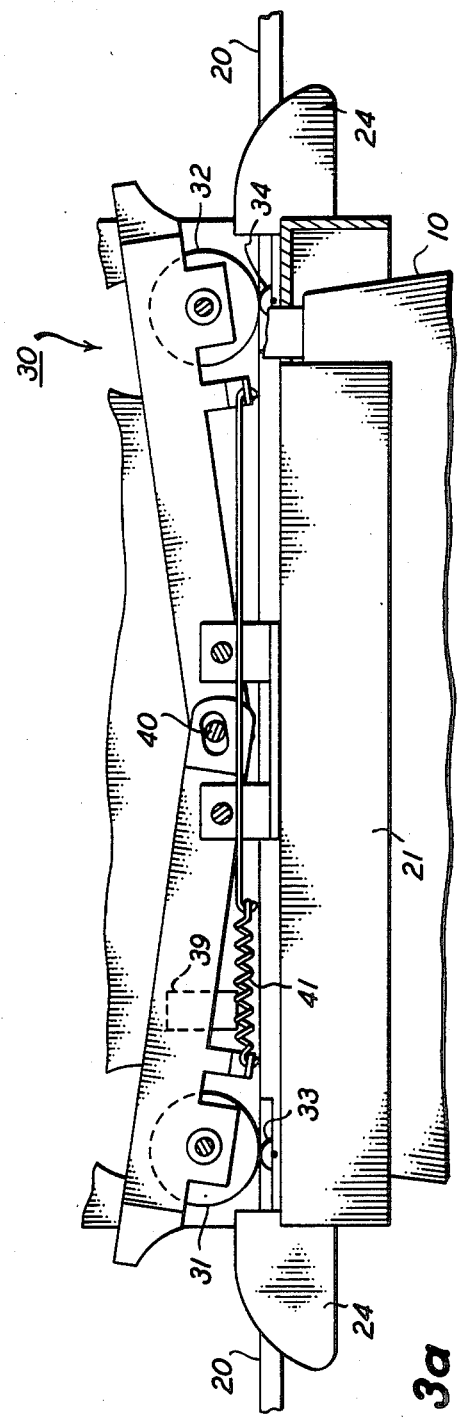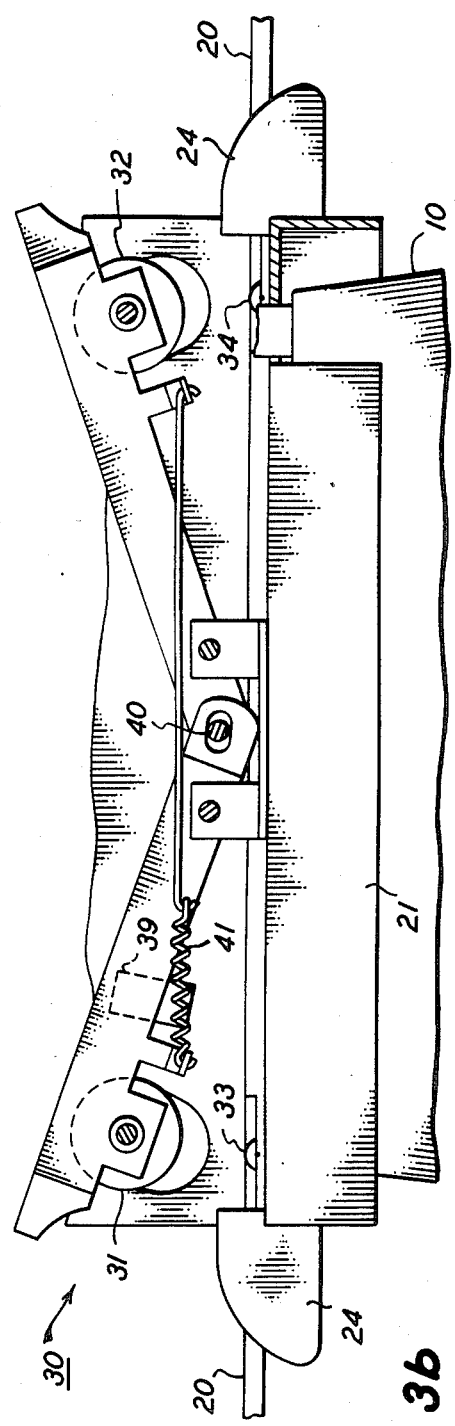

TRANSPARENCY TRANSPORT SYSTEM FOR OVERHEAD PROJECTOR

BACKGROUND

Transparencies for projection on an overhead projector are usually handled manually, even though it is distracting to both audience and speaker when attention is diverted to keeping the transparencies organized and positioned accurately within the projection window. Several page-turning systems have been suggested in U.S. Pat. Nos. 3,524,703; 3,537,792; and 4,203,659; but these have never become popular because something simpler and more convenient is needed.

I have devised a better way of transporting transparencies to an overhead projector. My system not only organizes the series of transparencies in a convenient, versatile, and compact way, but it includes a motor-driven transport system that advances transparencies simply by pushing a button. My system is also inexpensive, adaptable to many models of overhead projectors, and simple and convenient to use.

SUMMARY OF THE INVENTION

My system uses a transparent belt and platen to transport transparencies to the projection window of an overhead projector. The transparent platen extends across the projection window and beyond both sides of the projector. The transparent belt includes transparent base and pocket webs fused together to form a series of pockets sized to receive a sequence of transparencies. The fusion between each pocket forms transverse fold lines along which the belt can fan fold. The pocket web is preferably also fused to the base web at inturned edges of an open side of each pocket so that the distance between the inturned edges is smaller than the dimension of a transparency inserted through the open side into the pocket and thus retains the transparency securely within the pocket. The platen is positioned so that the transparent belt advances from a fan-fold supply stack and proceeds to an automatically formed fan-fold take-up stack.

DRAWINGS

FIGS. 3a and 3b are enlarged and partially schematic front elevational views of closed and open positions of belt drive components for the system of FIGS. 1 and 2;

DETAILED DESCRIPTION

Figure 1:
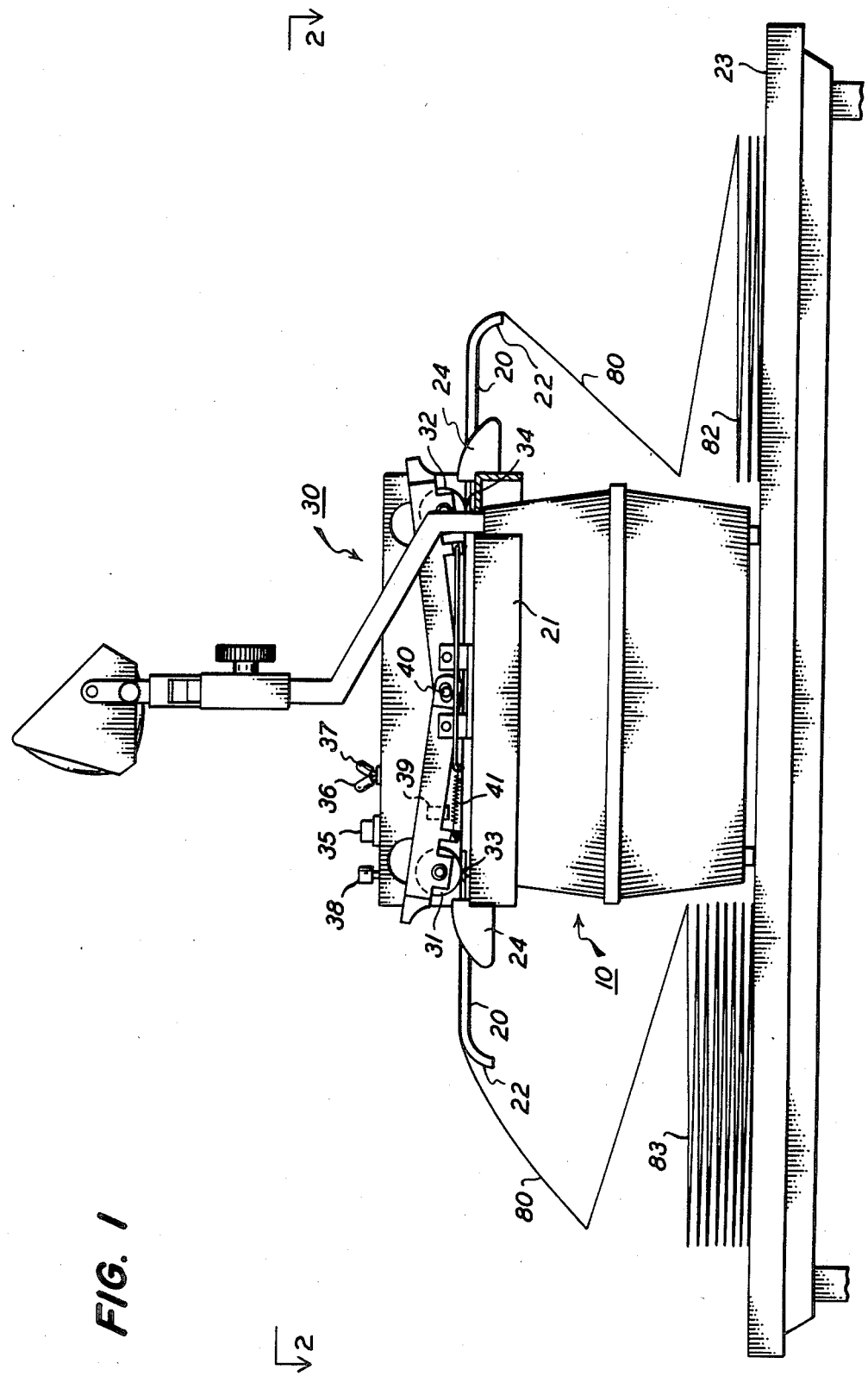
FIG. 1 is a partially schematic, front elevational view of an overhead projector provided with my inventive transparency transport system.

My system uses a transparent platen 20 positioned on an overhead projector 10 to extend over the projection window 11 and beyond both sides of projector 10. A drive system 30 arranged on platen 20 advances a transparent belt 80 that has a series of pockets sized to receive a sequence of transparencies. Belt 80 is made so that each pocket 81 securely holds a transparency 100 and so that belt 80 can fan fold along fold lines between each pocket to proceed from a fan-folded supply stack 82, across platen 20, and into an automatically formed, fan-fold take-up stack 83.

The workable interaction of these components is based on several discoveries. First, I found that a transparent platen 20 and belt 80, even though interposing several additional layers of transparent resin material into the light path through the transparency being projected, hardly degraded the quality of the projected image. Even when the extra layers of resin material interposed into the light path along with the transparency are not perfectly clear optically, degradation of the projected image is hardly noticeable.

Then I discovered a simple way of forming a transparent belt 80 with a series of pockets that can reliably hold a sequence of transparencies, and I discovered that such a belt can be formed so that it naturally fan folds. I also discovered that fan-folded supply and take-up stacks of a transparent belt cooperate effectively with a platen 20 extending beyond both sides of an overhead projector so that the fan-fold supply and take-up stacks can rest alongside the projector on the same table supporting the projector, and the belt can proceed automatically and effectively across the platen.

My invention also includes many related and more specific discoveries of practical ways of driving a transparency belt, loading it into a drive system, registering each successive transparency with the projection window, and otherwise making the system simple, economical, and effective.

Transparent belt 80 is preferably formed of a base web 84 and a pocket web 85, both of a transparent resin material. I prefer that webs 84 and 85 be formed of polyvinyl chloride, partly for cost and ease of handling, but many other transparent resin webs are possible. I also prefer that pocket web 85 be narrower than base web 84 and that pocket web 85 be centered between the longitudinal side edges of base web 84. Then pocket web 85 is preferably fused to base web 84 continuously along a line 86 near one edge 87 of belt 80. Fusion or seal line 86 then closes one side of each of the transparency pockets 81. The opposite side 88 of pocket web 85 is preferably not fused or sealed to the adjacent edge 89 of base web 84, leaving open one side 96 of each pocket 81.

The other two sides of each pocket 81 are preferably closed by transverse double fusion lines 90 and 91, which also form fold regions between each pocket 81. To facilitate fan folding in the transverse region between each pair of seams 90 and 91, I prefer a pair of oblong perforations 92 oriented to extend along the fold line. Perforations 92 leave pockets 81 interconnected by three tabs. Two of these are edge tabs 93 formed of base web 84 adjacent edges 87 and 89, and the third tab 94 comprises both base web 84 and pocket web 85 in a region between perforations 92. Of course, different numbers of perforations can be used along the fold line, and the perforations used and the interconnecting pocket tabs that remain can have different shapes and positions. I prefer the illustrated arrangement for a suitable combination of strength, flexibility, and ease of manufacture.

Transparencies 100 are generally 8½×11 inch size, and pockets 81 can be dimensioned to receive transparencies 100 for advancing the transparencies along either their long or short axes. Long axis advance has the advantage of enabling line-by-line revelation as a transparency moves top foremost in successive steps across a projection window, and short axis advance has the advantage of revealing information in two separate columns that can compare information, or show a problem in one column and its solution in the adjoining column.

Figure 5:
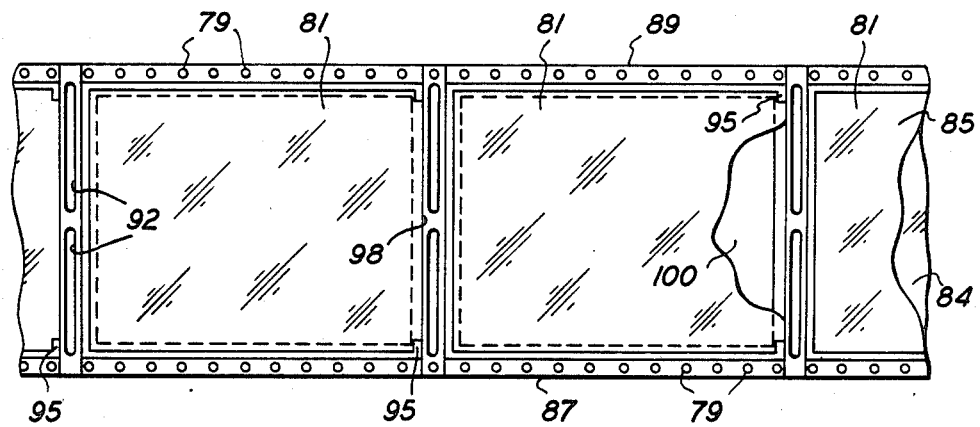
FIG. 5 is a fragmentary plan view of an alternative preferred embodiment for a transparent belt for the system of FIGS. 1–3.
Figure 6:
FIG. 6 is a fragmentary cross-sectional view of the belt of FIG. 4, taken along the lines 6—6 thereof.

Although I prefer longitudinal side opening 96 for pockets 81 for simplicity of manufacture and convenience of use, it is also possible to make belt 80 with pockets 81 that open along a transverse line 98, as shown in FIG. 5. Transverse openings 98 are preferably formed near transverse seams 91 and 92 along the interpocket fold lines.

I also prefer dimensioning pockets 81 so that a standard 8½×11 inch transparency fits closely within each pocket. For security in keeping each transparency 100 properly lodged in its pocket 81, I fuse pocket web 85 to base web 84 at inturned edges 95 at the open side 96 or 98 of each pocket 81 so that the distance between inturned edges 95 is smaller than the dimension of transparency 100 inserted through the open side 96 or 98 into pocket 81. This requires bending the transparency as it is inserted or removed so that it can be slid through the open space available between inturned edges 95 at the pocket opening. Once fully inserted into pocket 81, transparency 100 is then blocked by inturned edges 95 from skewing or spilling out of the open side 96 or 98 of pocket 81. When transparencies are oriented for advancement along their longitudinal axes, the distance between inturned edges 95 is a little less than 11 inches; and when transparencies are oriented for advancement along their short axes, the distance between inturned edges 95 is a little less than 8½ inches. To remove a transparency 100 from pocket 81, it is necessary to bend the transparency so that it will fit between inturned edges 95, but this is quick and easy to do, once learned.

Transparencies 100 are normally formed of a transparent polyester resin that does not tend to stick to the projection window of projector 10, even when warmed by the heat of the light source within projector 10. Forming belt 80 of polyester resin would similarly assure non-stickiness. I have found, however, that a belt 80 formed of polyvinyl chloride material tends to stick to platen 20 when warmed by the projection light source. The stickiness increases as the plasticizer increases in the resin material of belt 80, which in turn increases the bendable life of the belt. Rather than reducing the plasticizer and risking brittleness in the belt, I prefer cutting out a window 97 in base web 84 within the margin of pocket 81 so that most of the surface engaging platen 20 is formed of polyester transparency 100, rather than base web 84. Window 97 can be die cut in belt 84 within the boundaries of each pocket 81. Cutting out windows 97 makes belt 80 much more flexible and bendable, but each pocket 81 substantially stiffens when loaded with transparency 100. Opening of window 97 does not affect the quality of the projected image, and window 97 is not necessary for belts formed of resin material that does not tend to stick to warmed platen 20.

Platen 20 is preferably formed of a substantially rigid, transparent plastic resin. Although several resin materials are workable for platen 20, I prefer polystyrene. A base 21 supporting platen 20 preferably attaches to projector 10, and there are several ways that this can be done. One possibility is to use location holes that already exist on overhead projectors to accommodate a blank resin sheet arranged over the projection window and manually wound between supply and take-up rolls to serve as a sort of blackboard. Many other fasteners and interconnections are also possible, however.

Besides forming a flat, smooth, and clear surface over projection window 11 of projector 10, platen 20 extends beyond each side of projector 20 to downwardly curved ends 22 that are preferably disposed above the centers of fan-fold supply and take-up stacks 82 and 83. I have found that platen 20, resting on top of projector 10, is at a suitable height above a table 23 supporting both projector 10 and fan-fold stacks 82 and 83 so that belt 80 naturally fan folds into take-up stack 83 as it drops from edge 22 of platen 20. The fan folding of belt 80, cooperating with platen 20, greatly simplifies transparency transport, compared to using take-up and supply rolls with varying winding diameters. Fan folding of belt 80 also allows storage of transparencies 100 in a flat folded stack that can fit in a conventional file.

Drive mechanism 30 for advancing belt 80 across platen 20 is illustrated only schematically, because many different mechanical drive arrangements are possible, once platen 20 and the advancement of belt 80 across it are understood. One principle that I prefer in advancing belt 80 across platen 20 is that belt 80 should be pulled, rather than pushed, across projection window 11. I thus prefer a pair of drive elements 31 and 32 disposed on opposite sides of projection window 11, so that one drive element 31 can advance belt 80 and the another drive element 32 can reverse belt 80.

Tractor drive elements such as used for advancing printer paper can be used for driving belt 80, providing its marginal edges have perforations 79 as shown in FIG. 5 for receiving tractor wheel pins. I have found, however, that I can avoid the expense of forming perforations 79 by driving belt 80 with friction rollers 31 and 32 that engage belt 80 along marginal edges 87 and 89 and press belt 80 against underlying idler rollers 33 and 34. Lateral guiding of belt 80 longitudinally along platen 20 is preferably aided by guides 24 disposed above the top surface of platen 20 in the region where belt 80 approaches projection window 11.

Figure 2:
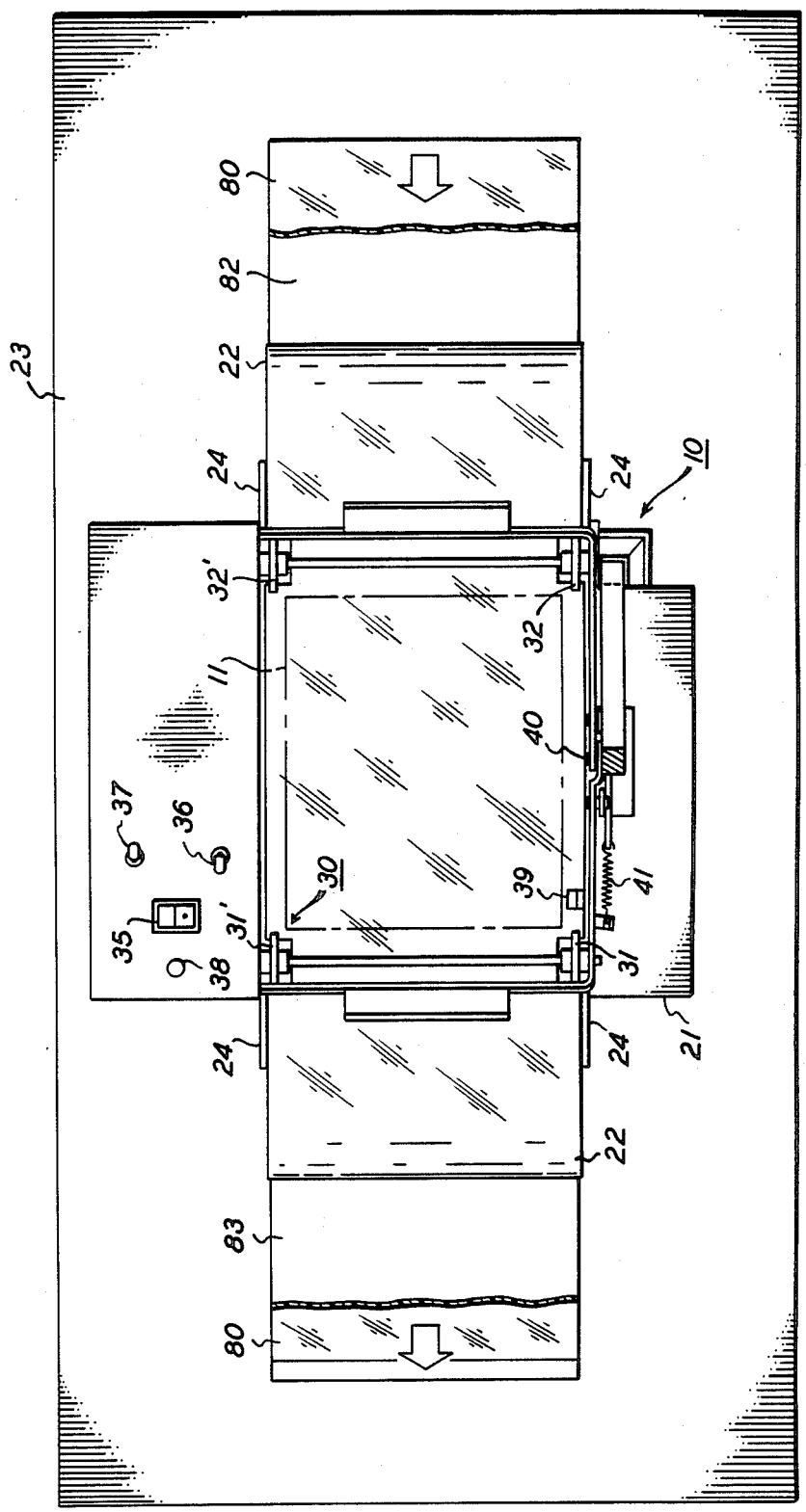
FIG. 2 is a partially schematic plan view of the system of FIG. 1.
Figure 4:
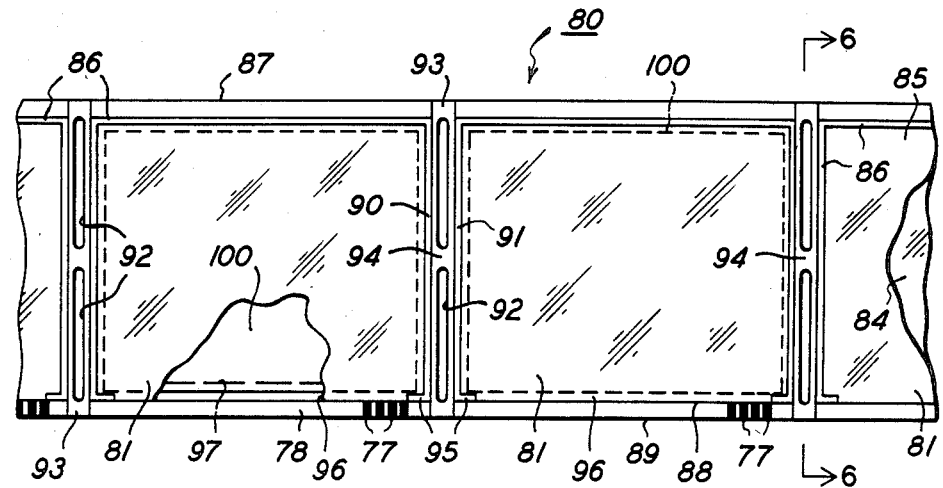
FIG. 4 is a fragmentary plan view of a preferred embodiment of a transparent belt for the system of FIGS. 1–3.
Figure 4A:
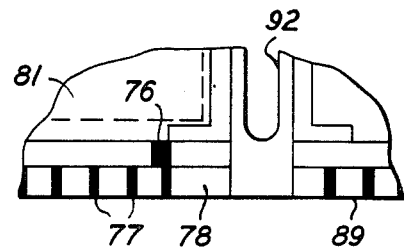
FIG. 4a is a fragmentary enlarged portion of a marginal edge of the belt of FIG. 4 showing a pair of detectable tracks.

I prefer a motorized drive with a few simple controls as illustrated in FIG. 2. I use an on/off switch 35 and a switch 36 to control forward or reverse drive. Another switch 37 selects between manual or automatic advance, and go button 38 is used to advance belt 80 by one pocket length to bring a successive transparency 100 into registry with projection window 11.

I also arrange a light source and detector 39 to direct a light toward belt 80 and detect the reflected beam for stopping the drive mechanism 30 at the proper position to register each transparency with projection window 11. There are several ways that this can be done, because detector 39 can detect several different discontinuities in belt 80. I prefer a series of marks 76 arranged on one of the margins of belt 80 so that each mark 76 registers with each pocket 81 where it can be detected for stopping each transparency in registry with projection window 11. A tape 78 secured to belt 80 can provide pocket registration indicia 76 and can also have another track of indicia 77 for detection by an additional detector 39 to allow line-by-line advance of a transparency. This can be programmed into drive mechanism 30, which can include a microprocessor. Perforations 79, if formed along the edges of belt 80, can also be detected for use in controlling the advancement of belt 80.

To thread belt 80 under drive rollers 31 and 32 or corresponding tractor drive wheels, I prefer a pivotal mount for rollers 31 and 32 so that they can be raised and lowered. By arranging pivot 40 above the axes of rollers 31 and 32 in an operating position, a spring 41 tensioned between rollers 31 and 32 can bias them downward to engage belt 80. The same spring 41 can hold rollers 31 and 32 above platen 20 when elevated as shown in broken lines to permit belt 80 to be passed under rollers 31 and 32 for start-up.

I claim:

1. An overhead projector transparency transport system comprising:
   a. a transparent platen extending across a projection window of said overhead projector and beyond both sides of said projector;
   b. a transparent belt formed of a transparent base web and a transparent pocket web fused together to form a series of pockets sized to receive a sequence of transparencies;
   c. said pocket web being fused to said base web along transverse fold lines between said transparency pockets so that said belt can fan fold;
   d. said pocket web being fused to said base web at inturned edges of an open side of each pocket so that the distance between said inturned edges is smaller than the dimension of a transparency inserted through said open side into said pocket; and
   e. said platen being positioned so that said transparent belt advances across said platen from a fan-fold supply stack and proceeds to an automatically formed fan-fold take-up stack.

2. The system of claim 1 wherein said fold lines have transversely oriented, cut out openings.

3. The system of claim 1 wherein the extension of said platen beyond said sides of said projector is for about one-half the distance between said fold lines.

4. A method of transporting unmounted, unframed, and semi-rigid transparencies to an overhead projector, said method comprising:
   a. placing said transparencies sequentially in a series of flexible pockets formed along a flexible transparent belt;
   b. forming said belt to fold between each of said transparency pockets by cutting out openings extending along fold lines between said pockets so that said belt, carrying said transparencies, can fan fold; and
   c. moving said belt over a transparent platen extending across a projection window of said overhead projector and sufficiently beyond both sides of said projector so that said belt advances from a fan-fold supply stack next to one side of said projector, across said platen supporting said belt in said projection window, and to a fan-fold take-up stack formed automatically next to the opposite side of said projector.

5. The method of claim 4 including detecting the registry of each transparency pocket with said projection window and stopping the advance of said belt when said registry occurs.

6. The method of claim 3 including detecting indicia on said belt for advancing predetermined portions of a transparency sequentially into registry with said projection window.

7. The method of claim 4 including positioning entrance and exit edges of said platen vertically above central regions of said fan-fold stacks positioned adjacent said projector.

8. The method of claim 4 including forming said belt of transparent resin base and pocket layers, fusing one edge of said pocket layer to said base layer, and fusing said pocket layer to said base layer along said cut out openings between each of said transparency pockets.

9. The method of claim 7 including making said cut out openings oblong and oriented to extend along said fold lines.

10. The method of claim 8 including fusing said pocket web to said base web at inturned edges of an open side of each pocket so that the distance between said inturned edges is smaller than the dimension of a transparency inserted through said open side into said pocket.

11. An overhead projector transparency transport system comprising:
   a. a transparent platen extending across a projection window of said overhead projector and beyond both sides of said projector;
   b. a flexible transparent belt having flexible pockets sized to receive a series of unmounted, unframed, and semi-rigid transparencies;
   c. said belt being formed with fold lines and cut out openings between said transparency pockets so that said belt can fan fold; and
   d. said platen being positioned so that said transparent belt advances across said platen from a fan-fold supply stack, across said platen extending over and supporting said belt in said projection window, and to an automatically formed fan-fold take-up stack.

12. The system of claim 11 wherein said cut out openings are oblong.

13. The system of claim 11 wherein said belt is formed of a transparent base web and a transparent pocket web, one edge of said pocket web being fused to said base web, and said pocket web being fused to said base web along said cut out openings.

14. The system of claim 13 wherein said pocket web is fused to said base web at inturned edges of an open side of each pocket so that the distance between said inturned edges is smaller than the dimension of a transparency inserted through said open side into said pocket.

15. The system of claim 11 wherein the extension of said platen beyond said sides of said projector is for about one-half the distance between said fold lines.

16. The system of claim 13 wherein said belt has a detectable discontinuity in a predetermined position relative to each of said transparency pockets so said discontinuities can be detected for stopping the advance of said belt with a pocketed transparency registered with said projection window.

17. The system of claim 16 including detectable discontinuities on said belt for advancing portions of a transparency sequentially into registry with said projection window.

18. A transparent platen for use with a transparent and flexible fan-fold belt for conveying unmounted, unframed, and semi-rigid transparencies to an overhead projector, said platen comprising:
   a. a clear resin plate extending across a projection window of said overhead projector for supporting said flexible belt and said transparencies in said projection window above said platen;

b. entrance and exit edges of said plate extending beyond respective sides of said projector to positions arranged above the centers of respective supply and take-up stacks of said fan-folded transparent belt located adjacent said projector; and c. said entrance and exit edges of said plate curving downward so that said transparent belt can be drawn onto a top surface of said plate from said supply stack and lowered from said plate automatically into said take-up stack.

19. A transparent resin belt for transporting transparencies to an overhead projector, said belt comprising:

a. two webs of transparent resin material fused together to form a series of open-sided pockets spaced along the length of said belt and sized to receive a sequence of transparencies;

b. fused transverse fold lines formed between each of said pockets so that said belt is able to fan fold in either direction at each of said fold lines; and c. said fused fold lines straddling cut out openings oriented transversely of said belt to increase the flexibility of said belt at said fold lines and facilitate fan folding of said belt.

20. The belt of claim 19 wherein said two webs include a pocket web and a base web fused together in the region of said transverse fold lines and along a longitudinal edge of said pocket web.

21. The belt of claim 20 wherein said base web is wider than said pocket web.

22. The belt of claim 20 wherein said pocket and base webs are fused together at inturned edge regions of an open side of each of said pockets so that the distance between said inturned edge regions is less than the dimension of a transparency inserted through said open side into said pocket.

23. The belt of claim 20 wherein a window is cut out of said base web within the edges of each of said pockets.

24. The belt of claim 20 including detectable discontinuities registered with each of said pockets for registering transparencies with a projection window of said overhead projector.

25. The belt of claim 24 including detectable indicia on a margin of said belt for advancing predetermined portions of a transparency sequentially into registration with said projection window.

26. A transparent belt for transporting transparencies to an overhead projector, said belt comprising:

a. a base web of transparent resin material and a pocket web of transparent resin material, said pocket and base webs being fused together around three sides of a series of open-sided pockets spaced along the length of said belt and sized to receive a sequence of transparencies; and b. said pocket and base webs being fused together at inturned edge regions at an open side of each of said pockets so that the distance between said inturned edge regions is less than the dimension of a transparency inserted through said open side into said pocket.

27. The belt of claim 26 wherein a window is cut out of said base web within the edges of each of said pockets.

* * * * *